United States Patent
Sadjadpour et al.

(10) Patent No.: US 9,191,093 B2
(45) Date of Patent: Nov. 17, 2015

(54) INTERFERENCE MANAGEMENT FOR CONCURRENT TRANSMISSION IN DOWNLINK WIRELESS COMMUNICATIONS

(75) Inventors: Hamid R. Sadjadpour, San Jose, CA (US); Jose Joaquin Garcia-Luna-Aceves, San Mateo, CA (US)

(73) Assignee: The Regents of the University of California, Oakland, CA (US)

(*) Notice: Subject to any disclaimer, the term of this patent is extended or adjusted under 35 U.S.C. 154(b) by 435 days.

(21) Appl. No.: 12/925,305

(22) Filed: Oct. 19, 2010

(65) Prior Publication Data

US 2011/0092233 A1 Apr. 21, 2011

Related U.S. Application Data

(60) Provisional application No. 61/279,444, filed on Oct. 20, 2009.

(51) Int. Cl.
*H04W 36/00* (2009.01)
*H04B 7/00* (2006.01)
(Continued)

(52) U.S. Cl.
CPC ............ *H04B 7/0697* (2013.01); *H04B 7/0613* (2013.01); *H04B 7/0684* (2013.01)

(58) Field of Classification Search
CPC ........ H04B 7/022; H04B 7/024; H04B 7/026; H04B 7/0408; H04B 7/0413; H04B 7/0421; H04B 7/061; H04B 7/0617; H04B 7/0632; H04B 17/005; H04B 17/006; H04B 17/0007; H04B 1/76; H04B 17/0057; H04B 7/0417; H04B 7/0452; H04B 7/0469; H04B 7/04; H04B 7/0615; H04B 7/0639; H04B 7/0669; H04B 7/0671; H04B 7/0673; H04B 7/0691; H04B 7/0857; H04B 7/10; H04B 7/0626; H04B 7/0684; H04B 7/0697; H04B 7/0802; H04B 17/21; H04B 17/309; H01Q 1/1257; H04L 1/0026; H04L 1/0033; H04L 1/0034; H04L 1/0656; H04L 1/0675; H04L 1/06; H04L 5/006; H04L 25/0204; H04L 1/0025; H04L 1/20; H04L 5/023; H04W 24/00; H04W 24/02; H04W 24/04; H04W 24/10; H04W 52/04; H04W 52/241; H04W 52/243; H04W 52/265; H04W 72/06; H04W 72/08; H04W 72/082; H04W 72/085
USPC ............... 455/25, 63.4, 272, 410, 422.1, 443, 455/506, 562.1; 341/29, 120; 370/252, 280, 370/329, 334, 335, 341, 342; 375/260, 267, 375/296, 299
See application file for complete search history.

(56) References Cited

U.S. PATENT DOCUMENTS 6,038,448 A * 3/2000 Chheda et al. ................ 455/436
7,366,253 B2 * 4/2008 Kim ..................... H04B 1/7097
375/299

(Continued)

OTHER PUBLICATIONS

R. Knopp and P. Humblet, "Information capacity and power control in single-cell multiuser communications," in Proc. of IEEE ICC 1995, Seattle, Washington, USA, Jun. 18-22, 1995.

(Continued)

*Primary Examiner* — Yuwen Pan
*Assistant Examiner* — Paul P Tran
(74) *Attorney, Agent, or Firm* — Lumen Patent Firm

(57) ABSTRACT

A wireless base station having K antennas communicates with M mobile devices using multiuser diversity scheme with opportunistic interference management. The base station transmits K distinct pilot signals from K corresponding antennas and receives feedback from mobile devices. The feedback from each device indicates a strong pilot signal and a weak pilot signal received from the K distinct pilot signals. Using these indications, the base station assigns each of the K antennas to a mobile device. The base station then transmits distinct data streams to the mobile devices using the corresponding antennas assigned to the corresponding mobile devices. The transmission may include multiplying the transmitted distinct data streams by a vector V orthogonal to a vector U, thereby allowing mobile devices not assigned to an antenna to cancel the transmitted distinct data streams.

12 Claims, 2 Drawing Sheets

(51) Int. Cl.

| | | |
|---|---|---|
| *H04B 15/00* | (2006.01) | |
| *H04M 1/00* | (2006.01) | |
| *H01Q 3/00* | (2006.01) | |
| *H04W 4/00* | (2009.01) | |
| *H04B 7/216* | (2006.01) | |
| *H04J 1/00* | (2006.01) | |
| *H04B 1/66* | (2006.01) | |
| *H04K 1/10* | (2006.01) | |
| *H04L 27/28* | (2006.01) | |
| *H04K 1/02* | (2006.01) | |
| *H04L 25/03* | (2006.01) | |
| *H04L 25/49* | (2006.01) | |
| *H04L 27/00* | (2006.01) | |
| *H04B 7/06* | (2006.01) | |

(56) References Cited

U.S. PATENT DOCUMENTS

| | | | | |
|---|---|---|---|---|
| 8,010,116 | B2* | 8/2011 | Scheinert | 455/443 |
| 8,036,164 | B1* | 10/2011 | Winters et al. | 370/329 |
| 2002/0002066 | A1* | 1/2002 | Pallonen | 455/562 |
| 2003/0153360 | A1* | 8/2003 | Burke et al. | 455/562 |
| 2003/0181163 | A1* | 9/2003 | Ofuji et al. | 455/25 |
| 2004/0082356 | A1* | 4/2004 | Walton et al. | 455/522 |
| 2006/0023650 | A1* | 2/2006 | Dominique | H04L 1/0026 370/310 |
| 2006/0270363 | A1* | 11/2006 | Sandhu et al. | 455/101 |
| 2008/0063116 | A1* | 3/2008 | Yokoyama | 375/299 |
| 2009/0262846 | A1* | 10/2009 | Ko | H04B 7/0408 375/260 |
| 2009/0322613 | A1* | 12/2009 | Bala et al. | 342/373 |
| 2009/0323619 | A1 | 12/2009 | Tajer | |
| 2010/0040162 | A1* | 2/2010 | Suehiro | 375/260 |

OTHER PUBLICATIONS

M. Sharif and B. Hassibi, "A comparison of time-sharing, DPC, and beamforming for MIMO broadcast channels with many users," IEEE Transactions on Communications, vol. 55, No. 1, pp. 11-15, Jan. 2007.

M. Sharif and B. Hassibi, "On the capacity of MIMO broadcast channels with partial side information," IEEE Transactions on Information Theory, vol. 51, No. 2, pp. 506-522, Feb. 2005.

A. Tajer and X. Wang, "Opportunistic multi-antenna downlink transmission with finite-rate feedback," in Proc. of Allerton 2008, Monticello, Illinois, USA, Sep. 23-26, 2008.

T. Yoo, N. Jindal, and A. Goldsmith, "Multi-antenna downlink channels with limited feedback and user selection," IEEE Journal on Selected Areas in Communications, vol. 27, No. 7, p. 14781491, Sep. 2007.

S. Sanayei and A. Nosratinia, "Opportunistic beamforming with limited feedback," IEEE Transactions on Wireless Commununications, vol. 6, No. 8, p. 2765 2771, Aug. 2007.

D. Tse, "Optimal power allocation over parallel Gaussian broadcast channels," in Proc. of IEEE ISIT 1997, Ulm, Germany, Jun. 29-Jul. 4, 1997.

P. Viswanath, D. Tse, and R. Laroia, "Opportunistic beamforming using dumb antennas," IEEE Transactions on Information Theory, vol. 48, No. 6, pp. 1277-1294, Jun. 2002.

M. Grossglauser and D. Tse, "Mobility increases the capacity of ad hoc wireless networks," IEEE/ACM Transactions on Networking, vol. 10, No. 4, pp. 477-486, Aug. 2002.

V. Cadambe and S. Jafar, "Interference alignment and degrees of freedom of the K-user interference channel," IEEE Transactions on Information Theory, vol. 54, No. 8, pp. 3425-3439, Aug. 2008.

J. Diaz, O. Simeone, and Y. Bar-Ness, "Asymptotic analysis of reduced-feedback strategies for MIMO Gaussian broadcast channels," IEEE Transactions on Information Theory, vol. 54, No. 3, pp. 1308-1316, Mar. 2008.

T. Yoo and A. Goldsmith, "On the optimality of multiantenna broadcast scheduling using zero-forcing beamforming," IEEE Journal on Selected Areas in Communications, vol. 24, No. 3, p. 528541, Mar. 2006.

\* cited by examiner

Fig. 3

300
Transmit K distinct pilot signals from the K antennas at the base station, where each of the K pilot signals is transmitted from a distinct corresponding antenna of the K antennas

302
Receive at the base station feedback from mobile devices that received the transmitted K distinct pilot signals, where the feedback includes an indication from each of the mobile devices of a strong pilot signal and a distinct weak pilot signal received from among the K distinct pilot signals transmitted

304
Assign each of the mobile devices to one of the K antennas using the indication from each of the mobile devices of a strong pilot signal and a weak pilot signal

306
Transmit from the base station distinct data streams to the mobile devices, where each data stream is transmitted a corresponding mobile device using the antenna assigned to the device

INTERFERENCE MANAGEMENT FOR CONCURRENT TRANSMISSION IN DOWNLINK WIRELESS COMMUNICATIONS

CROSS-REFERENCE TO RELATED APPLICATIONS

This application claims priority from U.S. Provisional Patent Application 61/279,444 filed Oct. 20, 2009, which is incorporated herein by reference.

STATEMENT OF GOVERNMENT SPONSORED SUPPORT

This invention was made with Government support under contracts W911NF-04-1-0224 and W911NF-05-1-0246 awarded by the US Army Research Office, contract CCF-0729230 awarded by the National Science Foundation, and contract FA8750-07-C-0169 awarded by the Air Force Research Lab. The Government has certain rights in the invention.

FIELD OF THE INVENTION

The present invention relates generally to wireless communications methods and systems. More specifically, it relates to methods for managing interference in wireless communications systems.

BACKGROUND OF THE INVENTION

It is well known that the communication capacity of wireless networks is limited by interference. Depending on the strength of the interference, there are three conventional approaches to this problem. If the interference is very strong, then the receiver can decode the interfering signal and subtract from the desired signal using successive interference cancelation. If the interference signal is very weak compared to the desired signal, it can be treated as noise. The third and most common possibility is when the interference is comparable with the desired signal. In this case the interference can be avoided by orthogonalizing it with the desired signal using techniques such as time division multiple access (TDMA) or frequency division multiple access (FDMA).

In addition to interference, wireless networks also experience channel fading. Conventional approaches to wireless networking attempt to combat fading. Depending on the coherence time of the fading, various approaches have been used. For example, fast fading may be mitigated by the use of diversity techniques, interleaving, and error-correcting codes. The use of multiple antennas provides channel diversity to combat fading and may also be used to increase multiplexing gain and system capacity.

Multiuser diversity scheme is a technique to increase the capacity of wireless networks using multiple antennas at the base station. In this approach the base station selects a mobile device that has the best channel condition, maximizing the signal-to-noise ratio (SNR). According to some implementations of this approach, K random beams are constructed and information is transmitted to the users with the highest signal-to-noise plus interference ratio (SINR). Searching for the best SINR in the network, however, requires feedback from the mobile devices that scales linearly with the number of users. These implementations also use beamforming, which is complex to implement. In addition, the cooperation requirement is substantial.

SUMMARY OF THE INVENTION

In one aspect, the present invention provides a new multiuser diversity technique for the downlink of wireless systems in which multiple mobile devices in a wireless system communicate with a base station at the same time and frequency. Unlike prior techniques that separately combat interference and channel fading, the present technique surprisingly uses channel fading to reduce the negative effects of interference. The result is very effective and achieves dirty paper coding (DPC) capacity asymptotically. Surprisingly, the technique does not require full channel state information (CSI) and only close to K integers related to CSI are fed back to the transmitter, where K is the number of antennas at the base station. Moreover, the encoding and decoding is significantly simpler than existing MIMO schemes and is similar to point-to-point communications.

Prior approaches to multiuser diversity were based on searching for the best channels to use. Surprisingly, the present inventors have discovered that searching simultaneously for the best and worse channels can lead to significant capacity gains. The discovered technique can asymptotically achieve DPC capacity as the number of mobile devices in the network, M, increases.

In general, $D \leq K$ mobile devices can implement the interference management scheme. The value of D, however, can be made arbitrarily close to the maximum value of K as long as M is larger than a specified value. In other words, the interference management technique is capable of achieving the maximum multiplexing gain as long as there is a minimum number of mobile devices in the network. Thus, the scheme does not require mobile devices to cooperate, as long as there are enough mobile devices in the network. If there are not enough mobile devices in the network, partial cooperation among them may be used to achieve the maximum multiplexing gain. If $D<K$ and K independent data streams are transmitted, then the remaining $K-D$ mobile devices may perform cooperative decoding. Thus, this multiuser diversity scheme provides a tradeoff between multiuser diversity and cooperation among mobile devices.

One of the main advantages of this technique is the fact that, by taking advantage of multiuser diversity, a distributed multiple-input multiple-output (MIMO) system in the downlink of wireless networks is reduced to a group of parallel single-input single-output (SISO) systems. Consequently, all the challenges and complexities related to space-time signal processing design in MIMO systems can be replaced by simple point-to-point communications while achieving maximum capacity as long as the number of mobile devices is adequate. This significant simplification of the signaling in the wireless systems is an additional advantage of interference management scheme.

The invention provides, in one aspect, a method of wireless communication in a wireless system having a base station transmitter having $K>1$ antennas and a collection of M mobile devices. The base station may be, for example, a cellular base station or a wireless network node. It may also be a virtual multiple antenna node comprising K single-antenna nodes collaborating to create the virtual multiple antenna node.

According to the method, the base station transmitter sequentially or simultaneously transmits K distinct pilot signals from the K antennas, where each of the K pilot signals is transmitted from a distinct corresponding antenna of the K antennas.

The base station receives feedback from mobile devices that received the transmitted K distinct pilot signals. The feedback includes an indication from each of the mobile devices of a strong pilot signal and a weak pilot signal received from the K distinct pilot signals. The strong pilot signal, for example, may be defined as a signal that has a received SNR value greater than an SNR threshold value, which is a predetermined system parameter. Similarly, the weak pilot signal may be defined as a signal that has a received INR value less than an INR threshold value, which is a predetermined system parameter. The feedback from each mobile device may include an indication of exactly one strong pilot signal and up to K−1 weak pilot signals. Alternatively, the feedback may include an indication of at least L weak pilot signals, where 1<L<K.

Using the indication from each of the mobile devices of a strong pilot signal and a weak pilot signal, the base station assigns a subset of the K antennas to a corresponding assigned subset of the mobile devices. The assigning may be performed by selecting a mobile device from among a subset of the mobile devices that have the largest combination of strong and weak pilot signals. The assigned subset of the K antennas may have a only one antenna or multiple antennas.

Using the assignments of the subset of the K antennas, the base station transmits distinct corresponding data streams to the corresponding assigned subset of the mobile devices using the assigned subset of the K antennas, wherein distinct data streams are transmitted using distinct antennas The transmission may include multiplying the transmitted distinct data streams by a vector V orthogonal to a vector U, thereby allowing mobile devices not assigned to an antenna to cancel the transmitted distinct data streams.

BRIEF DESCRIPTION OF THE DRAWINGS

FIG. 3 is a flow chart outlining steps in a method of wireless communication according to an embodiment of the invention.

DETAILED DESCRIPTION

Figure 1:
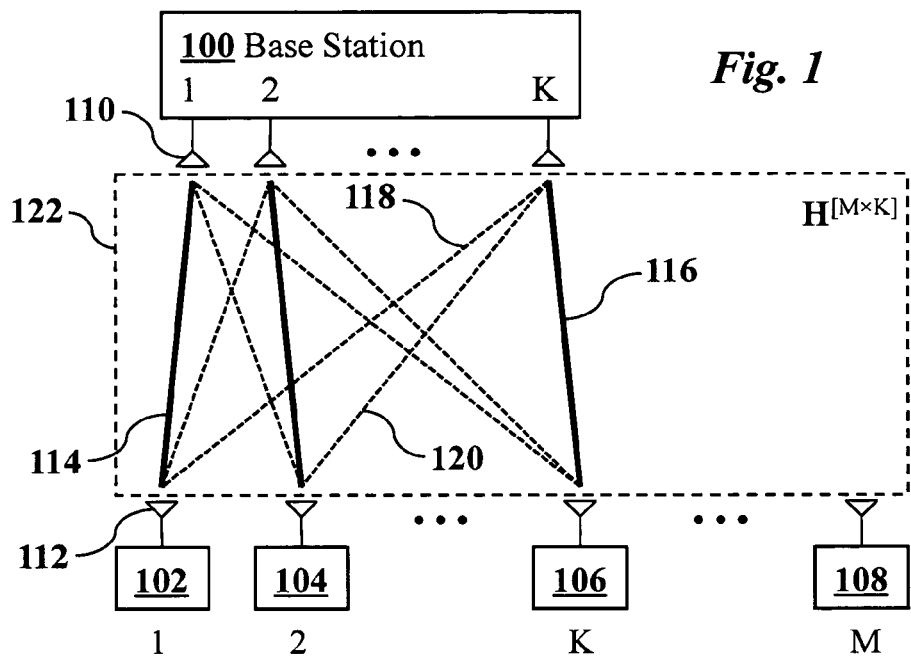
FIG. 1 is a schematic diagram of a wireless communication system implementing a technique for interference management according to an embodiment of the present invention.

Embodiments of the present invention provide techniques for interference management in wireless networks. Consider, for example, a network including a base station 100 with K antennas and M mobile devices including devices 102, 104, 106, 108, as shown in FIG. 1. The base station 100 may be a cellular base station or a node in a wireless data network. Base station 100 may also be a collection of K single-antenna nodes collaborating to create the virtual multiple antenna node.

In this embodiment of the invention, we assume that M>>K and that the base station 100 transmits K independent data streams to K mobile devices 102, 104, 106. For example, the first antenna 110 of base station 100 transmits a data stream over channel 114 to antenna 112 of mobile device 102. Similarly, the K-th antenna of the base station transmits a distinct data stream over channel 116 to mobile device 106. These data streams, however, may also be received as interfering signals by other mobile devices. For example, the data stream transmitted from antenna K also propagates over weak channels 118 and 120 to mobile devices 102 and 104, respectively. A challenge of interference management in multiuser diversity schemes is to select these channels appropriately, i.e.,
assign the K antennas to K corresponding mobile devices to improve performance of the downlink transmission of the data streams.

The channel 122 between the K antennas at the base station and the M mobile devices may be represented by a M×K matrix H with elements $h_{ij}$, where i=1, ..., K is the antenna index of the base station and j=1, ..., M is the mobile device index. We consider a block fading model where the channel coefficients may be treated as constant during a coherence interval of T. Then the M-dimensional received signal Y can be expressed as Y=Hx+n, where x is the K-dimensional transmit signal vector and n is the M-dimensional noise vector.

An outline of steps in a method of interference management according to an embodiment of the invention is shown in FIG. 3. In step 300, the base station transmitter sequentially or simultaneously transmits K distinct pilot signals from the K antennas, where each of the K pilot signals is transmitted from a distinct corresponding antenna of the K antennas.

In step 302, the base station receives feedback from mobile devices that received the transmitted K distinct pilot signals. The feedback includes an indication from each of the mobile devices of a strong pilot signal and a weak pilot signal received from the K distinct pilot signals. The strong pilot signal, for example, may be defined as a signal that has a received SNR value greater than an SNR threshold value, $SNR_{tr}$, which is a predetermined system parameter. Similarly, the weak pilot signal may be defined as a signal that has a received INR value less than an INR threshold value, $INR_{tr}$, which is a predetermined system parameter. In other words, $$SNR_{ii} \geq SNR_{tr}, 1 \leq i \leq d,$$

$$INR_{ji} \leq INR_{tr}, 1 \leq j \leq K, 1 \leq i \leq d, j \neq i$$

where $SNR_{ii}$ is the SNR of the signal received at mobile device i from antenna i, and $INR_{ji}$ is the INR for the signal received at mobile device i from antenna j. The feedback from each mobile device may include an indication of exactly one strong pilot signal and up to K−1 weak pilot signals. In an alternate embodiment, the feedback may include an indication of at least L weak pilot signals, where 1<L<K.

In step 304, using the indication from each of the mobile devices of a strong pilot signal and a weak pilot signal, the base station assigns each of the mobile devices to one of the K antennas. The assigning may be performed by selecting a mobile device from among a subset of the mobile devices that have the largest combination of strong and weak pilot signals.

In step 306, using the assignments of the K antennas, the base station transmits distinct data streams to the mobile devices. Each data stream is transmitted to each of the mobile devices using the antenna assigned to the corresponding mobile device. In one embodiment, transmission may include multiplying the transmitted distinct data streams by a vector V orthogonal to a vector U, thereby allowing mobile devices not assigned to an antenna to cancel the transmitted distinct data streams.

Figure 2:
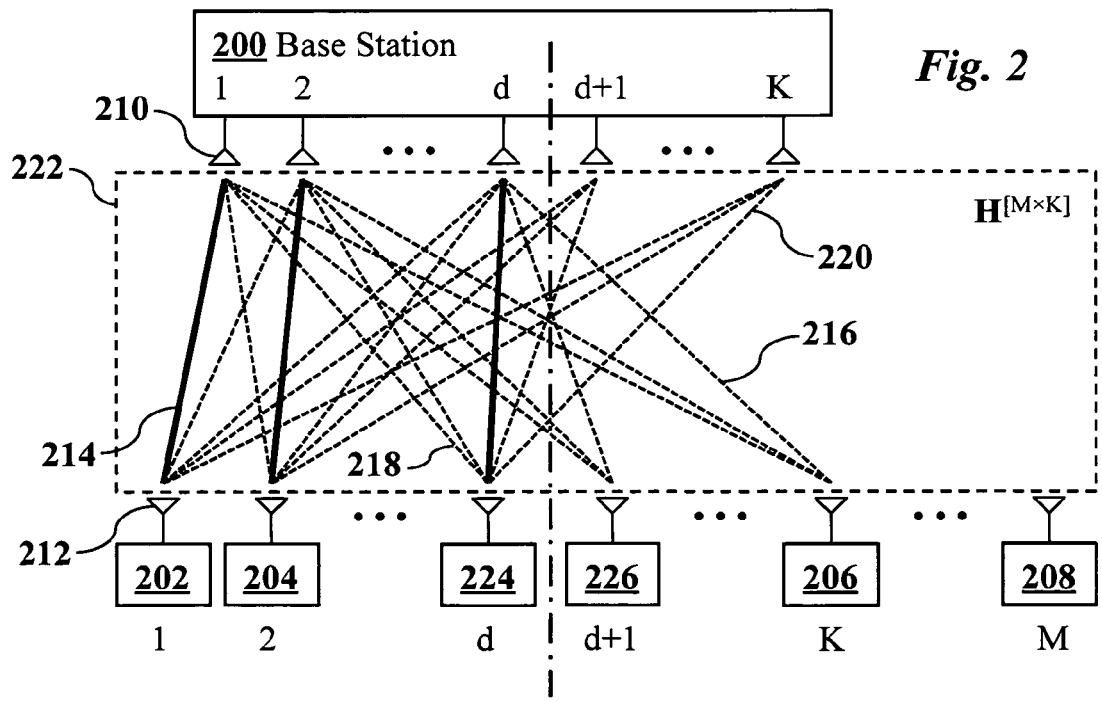
FIG. 2 is a schematic diagram of a wireless communication system implementing a technique for interference management according to another embodiment of the present invention.

Aspects of the above steps will now be described in more detail in relation to FIG. 2, which is a more general depiction of the system of FIG. 1. Base station 200 transmits over channel 222 using K antennas to M mobile devices including devices 202, 204, 224, 226, 206, 208. The channel 222 includes strong channels such as channel 214 from antenna 210 of base station 200 to antenna 212 of mobile device 202. The channel 222 also includes weak channels such as channels 216, 218, 220. FIG. 2 illustrates a more general scenario where d<K antennas have strong channels to d mobile devices, and K−d antennas have no strong channel to any mobile device.

During the first phase of communication, the base station antennas sequentially transmit pilot signals using K time slots. In this period, all the mobile devices listen to these known messages. After the last pilot signal is transmitted, the mobile devices that received the pilot signals evaluate the SNR for each of the K pilot signals which were transmitted from each of the K antennas. In one embodiment, if the SNR for only one of the K pilot signals is greater than a pre-determined threshold $SNR_{tr}$ and below another pre-determined threshold of $INR_{tr}$ for the remaining K−1 pilot signals, that particular mobile device will feedback to the base station information indicating which of the K pilot signals was strong. In practice, a mobile device may have strong signals from multiple antennas, and an antenna may have strong signals for multiple mobile devices. There will typically be a number of mobile devices that do not receive any pilot signal or receive only weak pilot signals.

The base station then uses this feedback information from mobiles to assign antennas to mobile devices. Through appropriate choice of indexing, without loss of generality, we assume that antenna i at the base station is assigned to mobile device of the same index i. In this figure, solid line and dotted line represent a strong and weak channel, respectively, between the base station and mobile station. Although there may be as many as K antennas assigned, FIG. 2 shows a general scenario in which d≤K antennas have strong channels to d corresponding mobile devices to which they are assigned.

Once the base station receives feedback information from the mobile devices and assigns antennas to corresponding devices, it transmits notifications to the assigned mobile devices in one time slot. Only one time slot is needed because the base station can transmit the individual notification messages from their corresponding antennas without any significant interference between the messages.

Thus, in contrast with most practical wireless systems in which only one mobile devices is assigned to any given frequency and time, using the interference management techniques of the present invention the number of mobile devices that can share the same frequency and time can be as large as the number of antennas at the base station. Clearly, this approach can increase the capacity of wireless networks significantly without requiring the use of complicated spatial beamforming techniques. This gain is achieved with a modest feedback requirement which is proportional to the number of transmitter antennas at the base station.

Surprisingly, using the present interference management technique, the number of mobile devices d with interference management capability can be made arbitrarily close to K by selecting appropriate network parameters. Through the choice of values for $SNR_{tr}$ and $INR_{tr}$ such that $SNR_{tr}>>INR_{tr}$, the base station can simultaneously transmit different signals from its antennas to different mobile devices without significant interference. The mobile devices only receive their intended signals with strong signal and can treat the other signals as noise. The value of $SNR_{tr}$ (or $INR_{tr}$) can be selected as high (or low) as required for a given system as long as M is large enough.

This technique achieves the optimum value of K multiplexing gain in the downlink when the channel fading is strong. This is contrary to the prior belief for point-to-point communications that fading always reduces the network capacity. The present inventors have discovered, to the contrary, that in a multiuser environment, fading actually is helpful. As the fading of the channel increases, the minimum number of mobile devices decreases. The new multiuser diversity scheme performs better when the fading strength in channel increases to take advantage of both strong and weak channels. Prior multiuser diversity techniques, in contrast, perform better by only taking advantage of strong channels.

The present multi-user diversity scheme also contradicts the prior understanding that the best antenna assignment is found by searching for the mobile with best channel condition. In contrast, according to the present technique, the assignment considers both strong signals and weak signals. Surprisingly, when the channel fading strength increases, better capacity performance in the network is achieved, assuming M is sufficiently larger than K. Thus, to achieve the benefits of the present interference management technique, it is assumed that the number of mobile devices M is greater than a minimum number.

The threshold values $SNR_{tr}$ and $INR_{tr}$ are selected based on estimated network parameters such as the channel fading parameter and the total number of mobile devices, M. Since the number of active mobile devices in a cell is known to the base station, the base station can adjust the $SINR_{tr}$ value such that the number of mobile devices qualifying the interference management condition does not increase significantly.

The relevant network parameters for consideration are M, K, $SNR_{tr}$, $INR_{tr}$, and the fading parameter σ. Of these values, the values of K and σ are related to the physical properties of the network, while the others are design parameters. Further, the parameters $SNR_{tr}$ and $INR_{tr}$ can be replaced with a single parameter $SINR_{tr}=SNR_{tr}/[(K-1) INR_{tr}+1]$.

For any value of K, M and σ, the network designer can select an appropriate value for $SINR_{tr}$ such that the maximum multiplexing gain is achieved at the expense of reduced rate for each individual mobile device, i.e., D=K.

For a selected value of $SINR_{tr}$ there is a maximum M that gives a network capacity of $d \log(1+SINR_{tr})$. When the $SINR_{tr}$ requirement increases, the number of mobile stations required to implement this technique increases. Therefore, to help keep the number M to a lower level, some embodiments may use capacity approaching techniques such as Turbo code or LDPC which have very low $SINR_{tr}$ requirements.

Thus far in the above description, it has been assumed the each mobile device uses a single antenna. It is possible to reduce the minimum required number of mobile devices further by providing each mobile device with two (or more) antennas. According to this embodiment, each mobile device receives each of the K pilot signals twice, once for each of its antennas, measures the SNR and INR values for each, compares these to $SNR_{tr}$ and $INR_{tr}$, and provides feedback for each. In effect, each mobile device acts as two independent mobile devices. From the base station point of view, providing the second additional antenna for each mobile device is equivalent to doubling the number of mobile devices in the system. Consequently, by providing a second antenna at each mobile device, the minimum number of mobile devices required to achieve a multiplexing gain is reduced by a factor of two. Because each mobile ends up using just one of the two antennas, this technique does not require space-time encoding or decoding.

In some embodiments, antenna selection may be based on the assumption that an average multiplexing gain of D is desired, where D<<K, i.e., there is a relatively large number of antennas at the base station. The task is then to select a subset of these antennas such that an equal number D of mobile devices satisfy the interference management criteria with respect to these antennas. A system parameter L<K may be defined as a minimum number of distinct pilot signals received by a mobile device that have received SNR to values below $INR_{tr}$. In the embodiments described earlier, the mobile devices feedback their information when they have one strong channel and K−1 weak channels. In this embodiment, on the other hand, each mobile device that has at least one strong channel and at least L weak channels feeds back its information to the base station. The mobile devices notify the base station which channels are strong, which ones are weak, and optionally which channels are neither strong nor weak. Hence, each mobile device responds with more additional information than the prior embodiment. This approach will increase the feedback, but there is a tradeoff between minimum required mobile devices for a given multiplexing gain and feedback requirement.

Among all the mobile devices that send their feedback information, the base station first selects the device that has a strong signal to the largest number of base station antennas. A table is created with the number of antennas related to this mobile device as values of the first row. Then, based on this set, it selects the next mobile device that has the largest subset of this set. This is iterated until a group of mobile devices is found that all have at least one strong signal and at least L weak signals. This is one sub-optimal technique to determine a combination of mobile devices that can receive data simultaneously without significant interference from other transmitters. In general, any search algorithm that provides sub-optimal or optimal maximum multiplexing gain can be used for mobile user selection.

It is significant to point out that the interference management techniques of the present invention can be incorporated into the current wireless standards. For example, in a TDMA system the base station can use L antennas for regular TDMA communication since the signals from these antennas are extremely weak at the mobile devices that are participating in interference management and so the TDMA communication will not interfere with these devices. On the other hand, transmit antennas at the base station that are participating in interference management can affect TDMA receivers. However, their signals can be orthogonalized at the TDMA receiver side using a technique that does not require any channel knowledge. The technique is fundamentally different from beamforming concept. For example, following is one practical approach for existing GSM cellular systems to guarantee the fairness and Quality of Service (QoS) for TDMA users while allowing other users to take advantage of interference management. For any TDMA user, the received signal vector can be written as $$R^T_{TDMA} = S^T_{TDMA} h_{TDMA} + \Sigma^d_{i=1} S_i h_i V^T + n^T,$$

where $R^T_{TDMA}$ and $S^T_{TDMA}$ are, respectively, the TDMA signal vector received by a mobile device and the signal transmitted by an antenna in the base station that does not participate in the interference management scheme, i.e., d<K. The superscript T represents transpose of a vector. $S_i$ and $V^T$ are, respectively, the signal transmitted by the antenna that is utilizing interference management scheme and a vector with unit weight that will be multiplied by each signal $S_i$. The vector n is the additive Gaussian noise vector, and the vectors $h_{TDMA}$ and $h_i$ are the channel state information between base station and mobile devices that are participating in TDMA and interference management, respectively. At the receiver, the received vector is multiplied by a vector U. This vector is orthonormal to V, i.e., $UV^T = 0$. Thus, the received signal will be equal to $$UR^T_{TDMA} = US^T_{TDMA} h_{TDMA} + \Sigma^d_{i=1} s_i h_i UV^T + Un^T = US^T_{TDMA} h_{TDMA} + n'$$

Note that the signals transmitted utilizing interference management scheme are now multiplied by this new vector V. Even though the TDMA user does not have the interference management capability and therefore other users are interfering with this user, when the orthogonal vector U is multiplied by the received vector, these interfering signals are cancelled. Furthermore, the vector V does not have any relationship with channel state information and this technique does not require any beamforming. For block fading channel, a two-dimensional vector is sufficient. Using the new transmission policy, the actual rate of signals participating in OIM scheme is reduced by a factor proportional to the length of vector V. However, the rate of the TDMA signal is still one symbol per channel use. If the wireless channel is block fading, then vectors of the form U=[u1, u2] and V=[v1, v2] are sufficient for implementation. We assume that the QPSK signals are used for transmission. For a combination of two QPSK signals, an appropriate choice would be a 16-QAM signal. One can use shift and rotation operation to create M-QAM constellations from QPSK symbols. The normalized values of vectors U and V are then $$U = \sqrt{\frac{2}{5}} \exp(\pi j/4) \left[ \sqrt{2}/2, \sqrt{2} \right]$$

$$V = \sqrt{\frac{2}{5}} \left[ \sqrt{2}, -\sqrt{2}/2 \right].$$

This illustrates just one concrete example of the technique using particular values of U and V.

The invention claimed is:

1. A method of wireless communication comprising:
at a base station comprising K>1 antennas, transmitting K distinct pilot signals from the K antennas, where each of the K pilot signals is transmitted from a distinct corresponding antenna of the K antennas;
at the base station, receiving feedback from mobile devices that received the transmitted K distinct pilot signals from the K antennas, wherein the feedback comprises an indication from each of the mobile devices of a strong pilot signal transmitted from one of the K antennas that has a received SNR value greater than a predetermined SNR threshold value and a weak pilot signal transmitted from another one of the K antennas that has a received INR value less than a predetermined INR threshold value, wherein the strong pilot signal and the weak pilot signal are two distinct signals received from the K distinct pilot signals transmitted from the K antennas; wherein the feedback comprises an indication of one strong pilot signal transmitted from one of the K antennas and up to K−1 weak pilot signals transmitted from up to K−1 of the K antennas, wherein the feedback comprises an indication of at least L weak pilot signals transmitted from L of the K antennas, where 1<L<K;
at the base station, assigning each antenna in a subset of the K antennas to each mobile device in a corresponding assigned subset of the mobile devices in a one-antenna-to-one-mobile-device correspondence, wherein the assigning comprises using the indication from each of the mobile devices of a strong pilot signal and a weak pilot signal; and
at the base station, transmitting distinct corresponding data streams to the corresponding assigned subset of the mobile devices using the assigned subset of the K antennas, wherein distinct data streams are transmitted at the same time and frequency using distinct antennas to implement multiuser diversity.

2. The method of claim 1 further comprising at the base station, transmitting to each of the mobile devices an assignment notification indicating the assigned one of the K antennas.

3. The method of claim 1 wherein the feedback comprises at most K integers.

4. The method of claim 1 wherein the assigning comprises selecting a mobile device from among a subset of the mobile devices that have the largest combination of strong and weak pilot signals.

5. The method of claim 1 wherein the transmitting distinct data streams to the mobile devices comprises multiplying the transmitted distinct data streams by a vector V orthogonal to a vector U whereby mobile devices not assigned to an antenna may cancel the transmitted distinct data streams.

6. The method of claim 1 wherein the K distinct pilot signals are transmitted sequentially from the K antennas.

7. The method of claim 1 wherein the K distinct pilot signals are transmitted simultaneously from the K antennas.

8. The method of claim 1 wherein the base station is a cellular base station.

9. The method of claim 1 wherein the base station is a wireless network node with K antennas.

10. The method of claim 1 wherein the base station is a virtual multiple antenna node comprising K single-antenna nodes collaborating to create the virtual multiple antenna node.

11. The method of claim 1 wherein the subset of the K antennas has only one antenna.

12. The method of claim 1 wherein the subset of the K antennas has multiple antennas.

* * * * *